United States Patent [19]

Griffith et al.

[11] Patent Number: 5,307,693
[45] Date of Patent: May 3, 1994

[54] FORCE-SENSING SYSTEM, INCLUDING A MAGNETICALLY MOUNTED ROCKING ELEMENT

[75] Inventors: Joseph E. Griffith, Berkeley Heights; Gabriel L. Miller, Westfield, both of N.J.

[73] Assignee: AT&T Bell Laboratories, Murray Hill, N.J.

[21] Appl. No.: 7,304

[22] Filed: Jan. 21, 1993

[51] Int. Cl.[5] .............................................. G01L 1/16
[52] U.S. Cl. ................................. 73/862.68; 73/105
[58] Field of Search ............... 73/105, 862.61, 862.68, 73/862.69, 862.626, 862.633, 606, 718, 724, 517 A, 517 R; 361/280, 283.2, 290, 299.3; 384/2, 446

[56] References Cited

U.S. PATENT DOCUMENTS

| | | | |
|---|---|---|---|
| 3,079,792 | 3/1963 | Hubbs | 73/862.61 |
| 3,245,707 | 4/1966 | Cook et al. | 384/2 |
| 4,130,624 | 12/1978 | Walker | 73/862.68 X |
| 4,551,674 | 11/1985 | Miller | 324/158 R |
| 4,893,071 | 1/1990 | Miller | 324/660 |
| 5,081,421 | 1/1992 | Miller et al. | 324/671 |
| 5,085,070 | 2/1992 | Miller et al. | 73/105 |

FOREIGN PATENT DOCUMENTS 0577395 10/1977 U.S.S.R. .................. 73/105

OTHER PUBLICATIONS

S. A. Joyce et al., "A new force sensor incorporating force-feedback control for interfacial force microscopy," Rev. Sci. Instrum. 62, 1991, 710-715.

G. L. Miller et al., "A rocking beam electrostatic balance for the measurement of small forces," Rev. Sci. Instrum. 62, 1991, 705-709.

Primary Examiner—Richard E. Chilcot, Jr.
Assistant Examiner—Elizabeth L. Dougherty
Attorney, Agent, or Firm—Martin I. Finston

[57] ABSTRACT

A force-sensing system suitable, for example, for atomic force microscopy. This system includes a rocking beam, a base, and means for supporting the beam adjacent a surface of the base such that the beam can pivot about at least one axis parallel to the base surface. In contrast to rocking-beam systems of the prior art, the support means comprise at least one pivot element that can be held against the base surface by a magnetic field.

8 Claims, 3 Drawing Sheets

FORCE-SENSING SYSTEM, INCLUDING A MAGNETICALLY MOUNTED ROCKING ELEMENT

FIELD OF THE INVENTION

This invention relates to the field of force-sensing systems such as those used in scanning force microscopy. More particularly, this invention relates to those systems that incorporate a force-sensing element comprising a rocking beam.

ART BACKGROUND

Force-sensing elements are widely used in scanning force microscopy. Rocking beam techniques have been applied in some of these systems. Rocking beam sensors are potentially advantageous because, in principle, they can be mechanically simple, rugged, highly sensitive, and relatively inexpensive to manufacture. In particular, these sensors offer high performance because they can be stabilized by a force-feedback servo loop. A further advantage of rocking beam sensors is that they can be used for a variety of microforce-sensing applications, including the measurement of tilt or acceleration. However, previous attempts to provide a rocking beam sensor have not been entirely satisfactory. Practitioners have found that pivoting mechanisms that offer sufficient sensitivity in the rocking direction generally tend to be fragile and too easily damaged during routine handling. At least some sensors have been found to be difficult to fabricate. The rocker elements of at least some of these sensors have proven difficult to remove and replace. (Rapid replacement is important in scanning force microscopy, for example. This is because the finely pointed probe tips, which are permanently mounted on the rocker elements, break or wear out relatively quickly.) Moreover, practitioners have encountered difficulties in stabilizing the rocker elements against undesired modes of mechanical motion.

For example, a rocking beam sensor fabricated from a thin sheet of beryllium-copper alloy is described in S. A. Joyce et al., "A new force sensor incorporating force-feedback control for interfacial force microscopy," *Rev. Sci. Instrum.* 62 (1991) 710–715. This sensor is a differential capacitance displacement sensor in which a common capacitor plate is suspended by torsion bars. The common capacitor plate and the torsion bars are integral with the beryllium-copper alloy sheet. Practitioners using this sensor have found that planarity of the rocker, which is essential to proper operation, is difficult to maintain because the beryllium-copper sheet tends to bend. Practitioners have also found that sensitivity is limited by stiffness of the torsion bars in the rocking direction, and that unwanted degrees of mechanical freedom make a substantial contribution to measurement noise.

An alternative rocking beam sensor is described in G. L. Miller et al., "A rocking beam electrostatic balance for the measurement of small forces," *Rev. Sci. Instrum.* 62 (1991) 705–709. In this sensor, which is also a differential capacitance displacement sensor, the rocker (which comprises the common capacitor plate) is a silicon beam which pivots on a carbon or tungsten fiber. The fragility of the fiber is an undesirable feature of this sensor. Damage to the fiber introduces undesired degrees of mechanical freedom, causing the signal output to be contaminated with noise. Moreover, this sensor relies on the weight of the rocker to hold it together, and therefore cannot be operated in an inverted orientation.

SUMMARY OF THE INVENTION

We have provided, for the first time, a rocking beam sensor which has a removable rocker element held onto a base by a magnetic field. Undesired degrees of freedom are minimized by using the magnetic field to firmly hold the rocker element against the base at a minimal number of contact points. This sensor is compact, lightweight, mechanically simple, and inexpensive to fabricate from readily available components. It is both mechanically rugged, and highly sensitive in the rocking direction. It can be operated in an arbitrary orientation.

Accordingly, the invention in one aspect is a force-sensing system which includes a base, a rocker beam, and support means. The base has a planar surface which includes at least first and second electrically conductive regions, and the rocker beam has a planar, electrically conductive surface. The support means are adapted to support the rocker beam adjacent the base surface such that the rocker-beam surface faces the base surface and first and second electrical capacitances are defined between the rocker-beam surface and the first and second conductive regions, respectively. The support means are further adapted such that the rocker beam can be tilted about at least one axis parallel to the base surface, and the rocker-beam surface can be made parallel to the base surface. The system further includes means for maintaining substantial equality between the first and second capacitances.

In contrast to force-sensing systems of the prior art, the support means comprise at least one pivot element comprising magnetic material, and means for magnetically holding the pivot element against the base surface.

DETAILED DESCRIPTION

Figure 1:
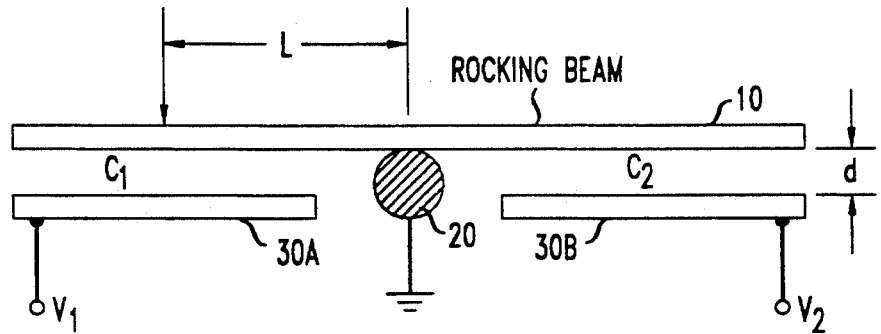
FIG. 1 is a schematic diagram of a rocking-beam force sensor, according to teachings of the prior art.

The principle of force balancing in a differential capacitance displacement sensor is fully discussed in, e.g., G. L. Miller et al., cited above, and will only be briefly reviewed here. Turning to FIG. 1, a rigid, grounded, electrically conducting beam 10 rocks on a central support 20 just above two stationary electrodes 30A and 30B. Each electrode has a capacitance to ground (through beam 10), respectively denoted $C_1$ or $C_2$. When the beam is balanced in its central position, the capacitances are both equal to a value C, and there is a constant gap d between the beam and the stationary electrodes. One end of the beam may be subjected to an externally applied force F (which will generally be the quantity to be measured). This force causes a moment FL about support 20, where L is the moment arm between the support and the point of application of the force. In atomic force microscopy, for example, the force F is provided by physical attraction between a sample and the tip of probe 5 of FIGS. 2 and 3. (In some alternative arrangements, the sample, and not the probe, is mounted on the beam.)

The angular position of the beam is conveniently monitored electrically by means of these capacitance values. That is, the imbalance between the two capacitances is detected by, e.g., a radio-frequency bridge technique. Each of the electrodes is maintained at a static, positive voltage, denoted, respectively, $V_1$ or $V_2$, where $V_1=V_0+\Delta V$, $V_2=V_0-\Delta V$, $V_0$ is a predetermined, constant voltage, typically about 30 V or somewhat less, and $\Delta V$ is an additional voltage provided by a feedback loop driven by the capacitive imbalance detector. The magnitude of $\Delta V$ is adjusted to produce a torque about support 20 that cancels the moment FL due to the external force.

If the force F is applied at a point halfway along one of the electrodes, the condition for balancing beam 10 is given by $F=2CV_0\Delta V/d$. Thus, the feedback voltage $\Delta V$ provides a linear measure of the applied force.

The feedback system will contribute an effective spring constant $\lambda_e$ that will generally dominate the stiffness of the beam with respect to the rocking angle $\theta$. If the feedback system has a constant open loop gain $G_0$, such that $\Delta V=G_0\theta$ ($G_0$ expressed in volts, $\theta$ expressed in radians), then in the low frequency limit this spring constant is given by $\lambda_e=2CV_0G_0/Ld$. Typical values to be substituted into this equation are: $C\approx 1$ pf; $V_0\approx 30$ V; $L\approx 1$ mm; and $d\approx 7$ μm. This substitution gives an estimated value for $\lambda_e$ of $0.01G_0$ N/m.

Figure 2:
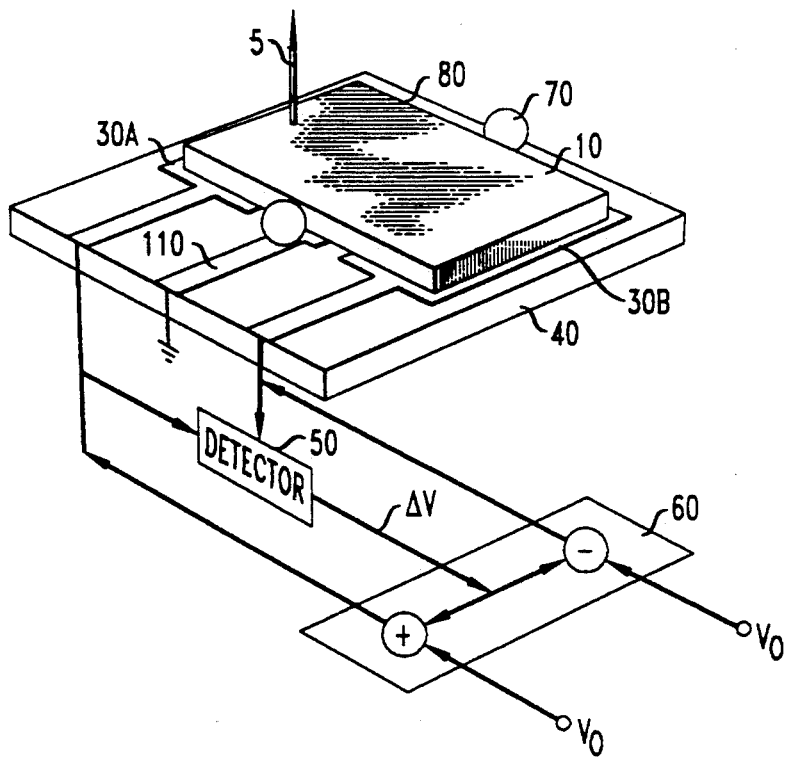
FIG. 2 is a schematic, partially perspective view of the inventive force sensor, in one embodiment.
Figure 3:
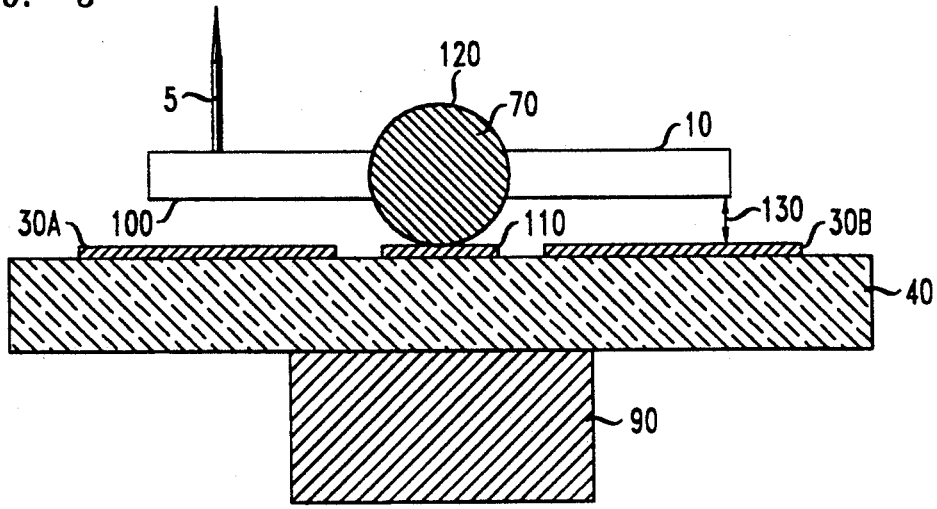
FIG. 3 is a schematic, side view of the inventive force sensor, in one embodiment.

According to a currently preferred embodiment of the invention, conveniently described with reference to FIGS. 2 and 3, electrodes 30A and 30B are electrically conductive films, exemplarily platinum films, each deposited on a planar, electrically insulating surface of base 40. Each of the electrodes is electrically connected to capacitive imbalance detector 50 and voltage source 60. The voltage source is controlled by a feedback loop from detector 50, as discussed above.

A currently preferred pivot arrangement uses a pair of spheres 70, each attached to one of the opposing, longitudinal faces 80 of beam 10. These spheres comprise a material that can be held against the upper surface (as viewed in the figure) of base 40 by a magnetic field. We have found that an appropriate magnetic field is conveniently provided by a permanent magnet 90 affixed to the lower surface (as viewed in the figure) of the base. In order for the magnetic force to be strong enough to prevent spheres 70 from shifting laterally while the force-sensing system is in use, it is desirable for the spheres to be composed of a ferromagnetic material. We have found that ball bearings composed of magnetic steel are suitable. A typical sphere is 1.6 mm in diameter. However, the useful range of sizes for these spheres is quite large. For example, we believe that diameters ranging from 0.1 mm or less, to 1 cm or more, may be useful.

Figure 4:
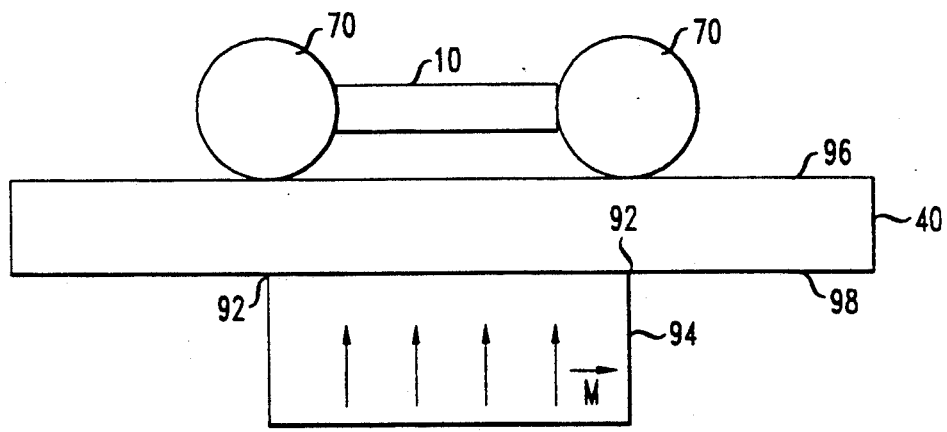
FIG. 4 is a schematic, end view of the inventive force sensor, in one embodiment.

Turning now to FIG. 4, we have found that the high magnetic field gradients at the edges 92 of a permanent magnet are particularly useful for holding the magnetic spheres. Accordingly, we have used a disc-shaped permanent magnet 94 having a diameter approximately equal to the center-to-center distance between the two spheres. The magnetization of this magnet is directed perpendicular to the principal surfaces 96, 98 of the base. Other shapes and arrangements of permanent magnets offering similar advantages will, of course, be apparent to the skilled artisan.

One convenient method for affixing the spheres to the beam is by gluing with electrically conductive epoxy cement. As noted, the underside (as viewed in the figure) of the beam will generally be electrically grounded. (In at least some cases, this ground connection may be made through a relatively small resistance, such as the series resistance of a current-measuring device.) The underside of the beam is typically coated with a layer 100 of an electrically conductive material such as platinum. (This is necessary if the beam is made from an insulating material, and is desirable even if the beam is made from a conductive material such as highly doped silicon.) When the beam is mounted on the base, there should be electrical continuity in a path which connects layer 100, spheres 70, and contact pad 110, which is made by depositing a conductive material on the base. To enhance the conductivity of this path, it is desirable to deposit a layer 120 of highly conductive material, such as platinum, on the surfaces of spheres 70. For example, we have found it convenient to deposit layer 100 on the underside of the beam, and layer 120 on the undersides of spheres 70, in a single-platinum-deposition step after affixing the spheres to the beam.

A typical base is a glass microscope slide, on which platinum electrodes 30A, 30B, and platinum contact pad 110 are deposited. An exemplary rocking beam is a rectangular parallelepiped of silicon, 10 mm long, 5 mm wide, and 0.25 mm thick. These dimensions may vary over a broad range. However, it is desirable for the beam to be thick enough for convenient handling and to prevent significant flexing during use. As noted, each of electrodes 30A, 30B defines a capacitor in which the upper plate is provided by a corresponding, overlying portion of layer 100 on the underside of the beam. The length and width of the beam should be adapted to provide an appropriate value for the corresponding capacitances. For example, we have found that a convenient value for these capacitances is about 1 pf, and a convenient size for the equilibrium gap 130 between the upper and lower capacitor plates is about 25 μm. These values correspond, approximately, to the exemplary dimensions given above.

Figure 5:
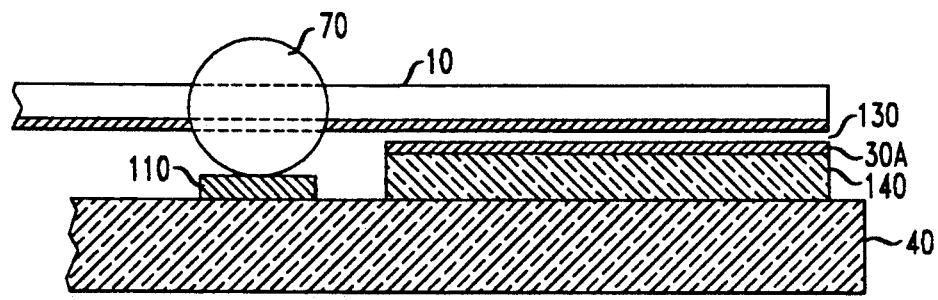
FIG. 5 is a detail of the force sensor of FIG. 3, illustrating one method for setting the capacitor gap.

As shown in FIG. 5, gap 130 may be set by affixing a pair of spacers 140 to the upper surface of base 40, and depositing electrodes 30A, 30B on the upper surface of the spacer. We have found it convenient to use a glass microscope cover slip, 0.229 mm thick, as a spacer. In an exemplary assembly procedure, a removable spacer, 0.254 mm thick, is placed on a flat work surface. The beam is placed on the spacer, but each of the spheres is placed directly on the work surface, adjacent the beam. Each sphere is aligned with the rocking axis of the beam and cemented in position. This assures that gap 130 will be about 25 μm wide when spacers 140 are 0.229 mm thick.

Figure 6:
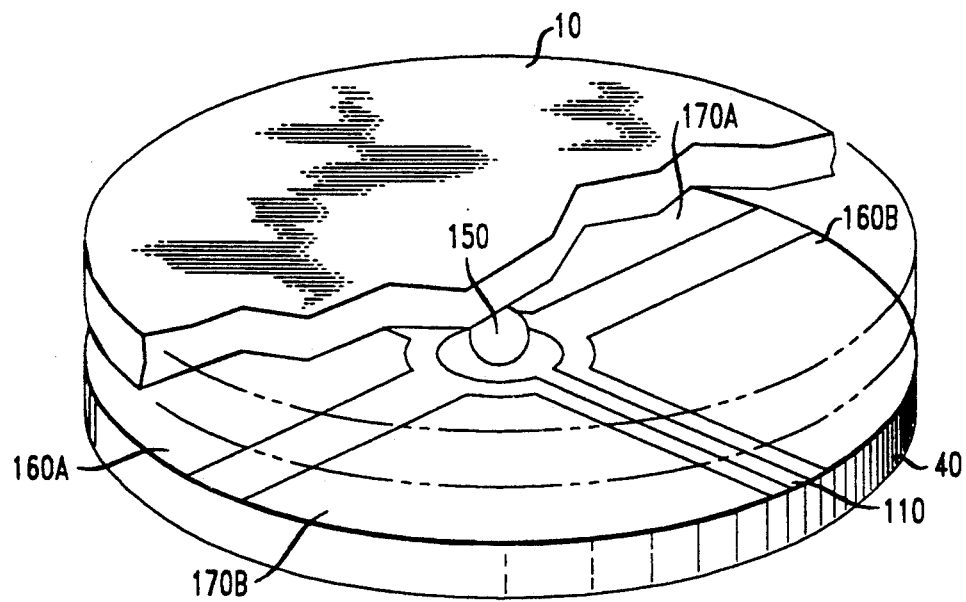
FIG. 6 is a schematic diagram of an alternate embodiment of the inventive force sensor, in which the beam can rock about two axes instead of one axis.

In alternate embodiments of the invention, such as the illustrative embodiment depicted in FIG. 6, the rocker is supported at its center by a single sphere 150 (or other pivoting element), and is therefore permitted to rock in two dimensions (for example, about an arbitrary axis parallel to the base surface). Feedback is provided by an array of capacitors, provided, for example, by orthogonal electrode pairs 160A-160B and 170A-170B.

The use of spherical pivot elements (whether singly or in pairs) is advantageous because it assures that the mounting of the rocking beam is kinematic; that is, the pivoted assembly makes contact with the base at the minimum number of points required to define the pivot axis or axes. By avoiding overdefinition of the pivot axis, this type of mounting reduces or eliminates noise from random shifting that could otherwise occur among extra contact points. It should be noted, however, that spherical pivot elements are not unique in this regard. Elements of other shapes can also provide kinematic mounting, and we means to include such alternative elements within the scope of our invention. Exemplary alternative shapes include pyramids and cones, where the apex is the pivot point which makes contact with the base surface.

We claim:

1. A force-sensing system which comprises:
   a) a base member having a principal surface at least a portion of which is substantially planar and electrically conductive;
   b) a rocker element having a principal surface at least a portion of which is substantially planar and electrically conductive;
   c) at least one pivot element for supporting the rocker element on the base member such that: said base-surface portion faces said rocker-surface portion, the rocker element can be tilted about at least one axis parallel to said base-surface portion; and at least one capacitance is defined between said base-surface portion and said rocker-surface portion; and
   d) means for controlling the capacitance;
   characterized in that
   e) the pivot element comprises magnetic material; and
   f) the force-sensing system further comprises means for providing a magnetic field adapted to hold the pivot element against the base principal surface.

2. The system of claim 1, wherein the magnetic means comprise a permanent magnet affixed to the base.

3. The system of claim 1, wherein the base comprises magnetic material, and at least a portion of the base is magnetized, such that the magnetic means are coextensive with the magnetized base portion.

4. The system of claim 1, wherein the pivot element consists of one spherical body, such that the rocker element can be tilted about two independent axes that lie parallel to the base principal surface.

5. The system of claim 1, wherein the at least one pivot element consists of two spheroidal bodies.

6. The system of claim 1, wherein the at least one pivot element is adapted such that the mounting of the rocker element on the base principal surface is kinematic.

7. The system of claim 2, wherein the permanent magnet is located relative to the pivot element such that the pivot element experiences a relatively high magnetic field gradient.

8. The system of claim 5, wherein the rocker element is a rectangular parallelepiped having two longitudinal faces perpendicular to said rocker-element principal surface, and each of the spheroidal bodies is affixed to one of the longitudinal faces.

* * * * *